US012198514B2

(12) United States Patent
Else et al.

(10) Patent No.: US 12,198,514 B2
(45) Date of Patent: Jan. 14, 2025

(54) MULTI-FUNCTION SENSOR TYPE FOR PREMISES SECURITY SYSTEMS

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 22 days.

(21) Appl. No.: 18/089,910

(22) Filed: Dec. 28, 2022

(65) Prior Publication Data

US 2024/0221479 A1 Jul. 4, 2024

(51) Int. Cl.
*G08B 13/02* (2006.01)

(52) U.S. Cl.
CPC .................................... *G08B 13/02* (2013.01)

(58) Field of Classification Search
CPC ....... G08B 13/02; G08B 25/008; G08B 13/08
See application file for complete search history.

(56) References Cited

U.S. PATENT DOCUMENTS 6,989,746 B2 1/2006 Rasmussen
10,089,851 B1 * 10/2018 Singh .................. G08B 29/183
2011/0149078 A1 6/2011 Fan et al.
2015/0287298 A1 10/2015 Zur et al.
2016/0049071 A1 2/2016 Beaver et al.
2016/0187368 A1 6/2016 Modi et al.
2016/0249281 A1 * 8/2016 Sahni ................ H04W 52/0235
2017/0098351 A1 4/2017 Modi et al.
2017/0243456 A1 8/2017 Smith
2017/0372569 A1 12/2017 Lamb et al.
2019/0107998 A1 4/2019 Hawk et al.
2021/0201636 A1 * 7/2021 Amir ...................... G08B 29/26
2021/0272431 A1 * 9/2021 Chavady ............ G08B 13/1966
2022/0004247 A1 1/2022 Gruber

FOREIGN PATENT DOCUMENTS

FR 3061073 A1 6/2018
GB 2088107 A 6/1982
WO 2020187859 A1 9/2020

* cited by examiner

*Primary Examiner* — Joseph H Feild
*Assistant Examiner* — Sharmin Akhter
(74) *Attorney, Agent, or Firm* — Weisberg I.P. Law. P.A.

(57) ABSTRACT

According to some embodiments, a premises security system that is configured to monitor a premises is provided. The premises security system includes a multi-function premises device including a multi-axis accelerometer for monitoring the premises according to at least one of a plurality of sensor types where the multi-function premises device is configured to generate device data including accelerometer data associated with the multi-axis accelerometer. The premise security system includes a security control device configured to receive the device data, analyze the device data based on one of the plurality of sensor types, and initiate a premises security system action based on the analysis.

20 Claims, 4 Drawing Sheets

MULTI-FUNCTION SENSOR TYPE FOR PREMISES SECURITY SYSTEMS

TECHNICAL FIELD

The present technology is generally related to premises security system, and in particular to a multi-function sensor type for a premises security system.

BACKGROUND

Some existing premises security systems use a variety of different sensors to monitor a premises. One such sensor includes a door/window sensor that uses a magnet attached to the door or window and a reed switch that is attached to the frame opposite the magnet to sense when the magnet pulls away from the reed switch, i.e., the opening of the door or window. Another example sensor is a glass break detector that uses a microphone to detect breaking sounds of glass and an algorithm for determining the accuracy of the detected breaking sounds.

A shock sensor is another type of sensor used in premises security systems. A shock sensor may include a piezoelectric plate that generates a detectable electrical output based on a bending stress caused by a shock or sudden force. A premises security system may then trigger an alarm in response to the output of the separate sensors. Hence, these existing premises security system use three distinct types of sensing mechanisms to monitor different portions of the premises.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
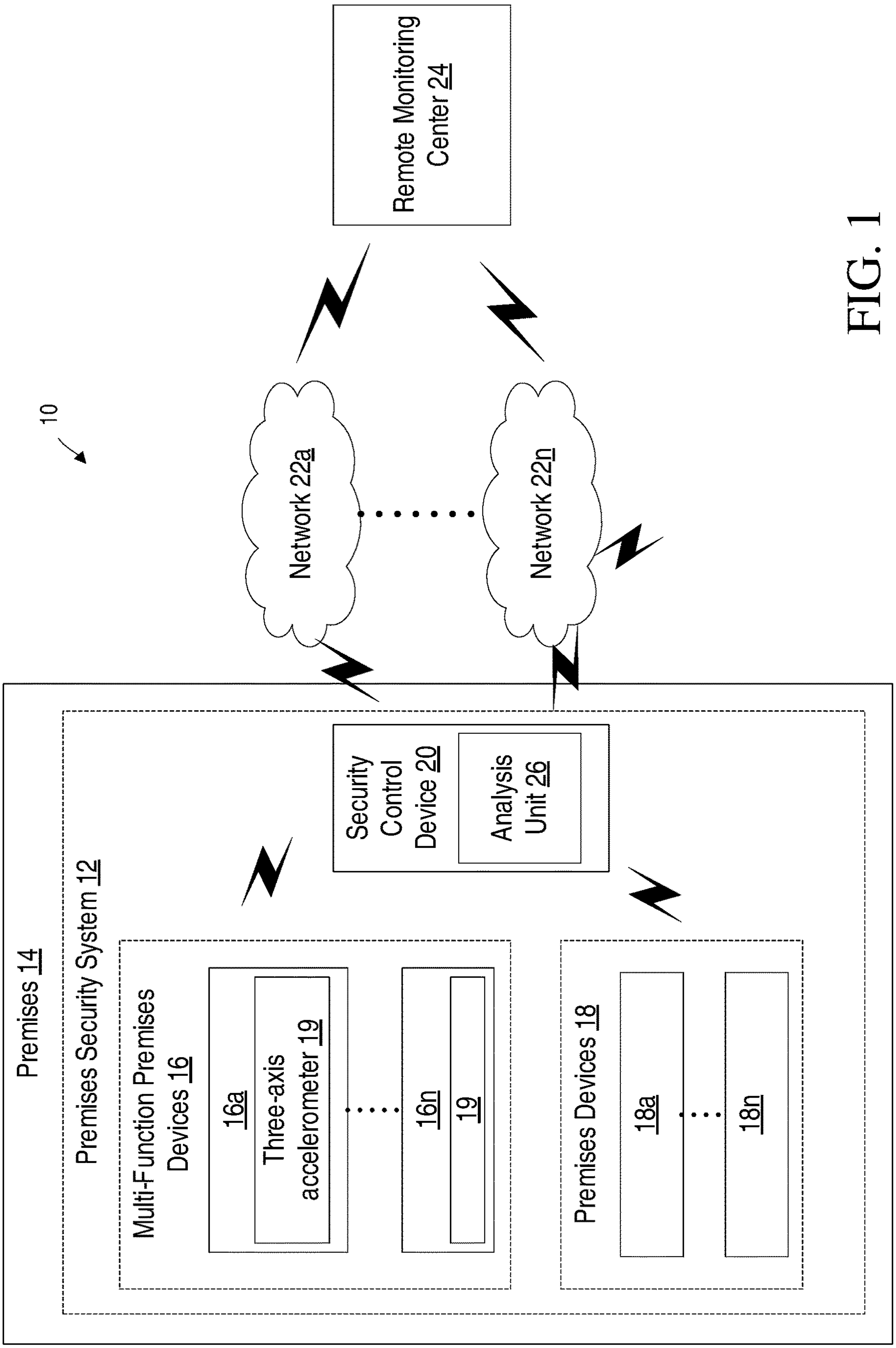
FIG. 1 is a block diagram of an example system according to some embodiments of the present disclosure.

Some existing premises security systems use various different sensors to monitor different areas or portions of the premises. However, installing these different sensors may increase the complexity of setting up the premises security system which may lead to false alarms in cases where, for example, the homeowner installs different sensors.

The present disclosure helps solve the problem with existing premises security system by, for example, providing a premises device for monitoring the premises where the premises device is a multi-function sensor type that implements the functionality of various different sensors using the same sensing element as opposed to using different sensing elements for different sensors. For example, a premises device according to various embodiments comprises a multi-axis accelerometer (e.g., three-axis accelerometer) that is able to provide the sensing functions of a plurality of existing sensors, as described herein.

Before describing in detail exemplary embodiments, it is noted that the embodiments may reside in combinations of apparatus components and processing steps related to a premise device providing a multi-function sensor type for monitoring a premises. Accordingly, components may be represented where appropriate by conventional symbols in the drawings, so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes," "including," "has," and/or "having" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide premises devices in a premises security system. Referring now to the drawing figures, in which like elements are referred to by like reference numerals, there is shown in FIG. 1 an example system and designated generally as "10." System 10 includes a premises security system 12 for monitoring premises 14, and one or more multi-function premises devices 16*a*-16*n* (collectively referred to as "multi-function premises device 16") and premises devices 18*a*-18*n*, located in and/or around premises 14. Multi-function premises device 16 refers to a premises device that is configured to provide any one of a plurality of sensor types using a sensing element, such as a multi-axis accelerometer 19, as described herein.

Premises security system 12 includes security control device 20 in communication with multi-function premises device 16 and premises device 18 for receiving device data from premises device 18 and multi-function premises device 16, and in communication with remote monitoring center 24 via one or more networks 22. Security control device 20 may be configured to communicate with any component of system 10 and/or perform or trigger at least one premises security action associated with any component of system 10. Further, in one or more embodiments, security control device 20 includes analysis unit 26 which is configured to perform one or more security control device 20 functions as described herein such as with respect to analyzing device data generated by multi-function premises device 16 such as, for example, according to one of a plurality of sensors types the premises device has been configured to implement. For example, multi-function premises device 16 is positioned at a premises 14 to provide monitoring according to a first sensor type whereas the security control device 20 is configured to analyze device data from the multi-function premises device 16 according to one or more rules for the first sensor type. At a later time, the same multi-function premises device 16 is re-positioned at the premises 14 to provide monitoring according to a second sensor type different from the first sensor type where the first and second sensor types use the three-axis accelerometer for monitoring the premises 14 according to the respective sensor type. This example is used to describe multi-function premises device 16 that is able to provide sensor functionality for various different types of sensors while still using the same sensor element (e.g., a three-axis accelerometer). Security control device 20 may also receive device data from premises device 18 for analysis.

In another example, a plurality of multi-function premises devices 16*a-c* may be positioned and/or configured at premises 14 for monitoring where multi-function premises device 16*a* provides door/window sensor functions, multi-function premises device 16*b* provides shock and/or vibration sensor functions and multi-function premises device 16*c* provides glass break functions.

Although premises security system 12 is shown as comprising multi-function premises devices 16*a*-16*n* and premises devices 18*a*-18*n*, premises security system 12 may include additional premises devices 16, 18. Any multi-function premises device 16 and/or premises device 18 can be in simultaneous communication and/or configured to communicate separately with more than one other premises device 16 and/or 18, and/or other premises security system 12 and/or other system 10. Communication between components and/or devices of system 10 may be direct communication and/or via one or more networks (not shown).

Further, some premises device 18 may include one or more sensors. For example, the types of sensors may include various life safety related sensors such as motion sensors (e.g., IR transmitter and receiver), fire sensors, carbon monoxide sensors (e.g., CO-smoke multi-function sensor), flooding sensors and contact sensors, among other sensor types. Premises device 18 may include one or more control devices such as, for example, one or more lifestyle (e.g., home automation) related devices configured to adjust at least one premises setting such as lighting, temperature, energy usage, door lock and power settings, among other settings associated with the premises devices 18 on the premises. Image capture devices may include digital cameras and/or video cameras, among other image capture devices.

Remote monitoring center 24 may be capable of performing certain monitoring, configuration and/or control functions associated with system 10. For example, with respect to fire and carbon monoxide detectors/sensors, device data may include carbon monoxide readings, smoke detection readings, sensor location and time of readings, among other information related to these detectors that may be communicated with remote monitoring center 24. In another example, with respect to a multi-function premises device 16, device data may include information regarding sensor location and time of detection, among other data related to the door opening detection that may be communicated with remote monitoring center 24.

Figure 2:
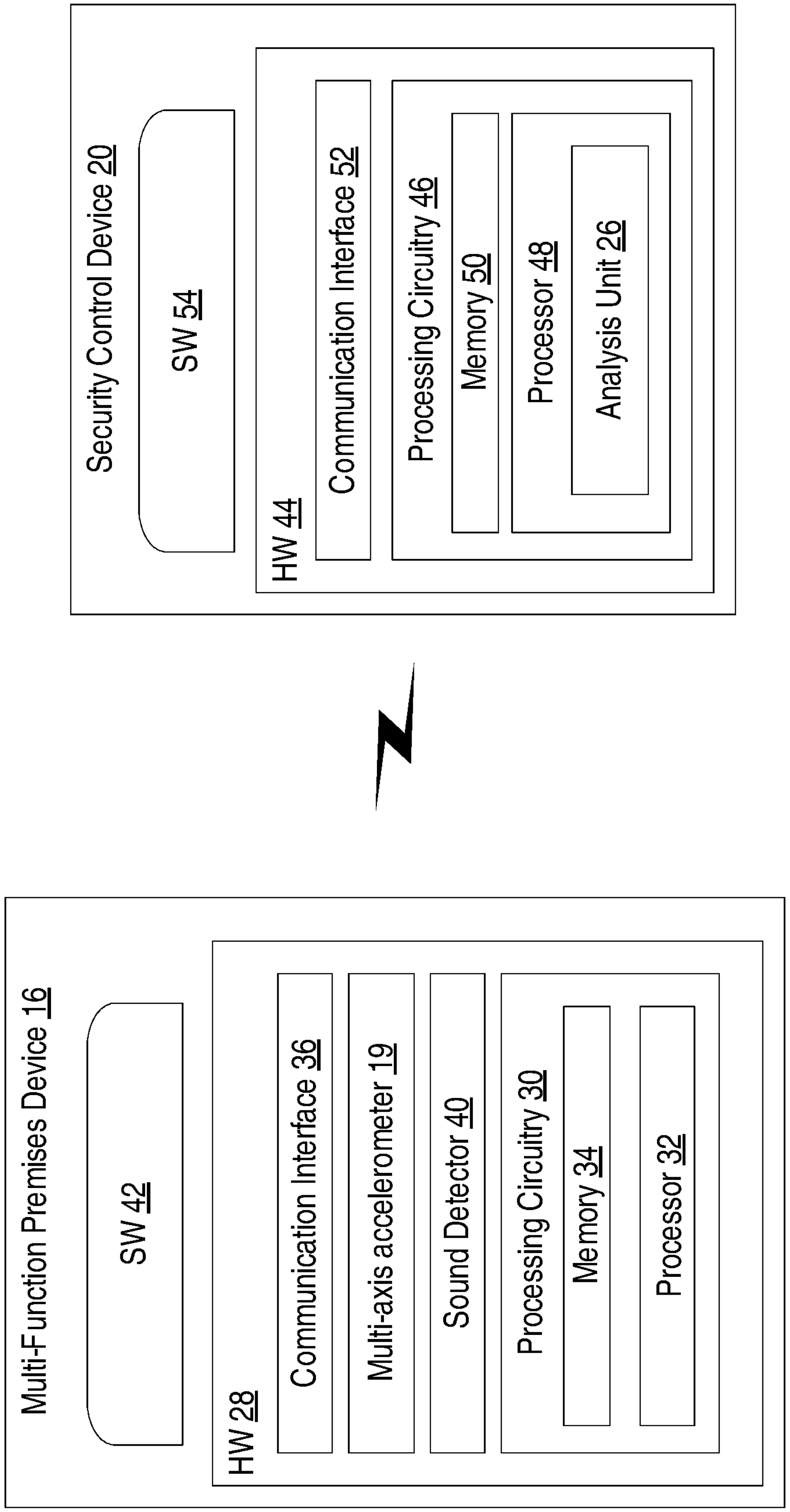
FIG. 2 is a block diagram of some devices according to some embodiments of the present disclosure.

Example implementations, in accordance with an embodiment, of system 10 discussed in the preceding paragraphs will now be described with reference to FIG. 2.

The system 10 includes a multi-function premises device 16 including hardware 28. The hardware 28 may include processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors, processor cores, field programmable gate arrays (FPGAs), and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory, random access memory (RAM), read-only memory (ROM), optical memory, and/or erasable programmable read-only memory (EPROM). Further, memory 34 may be configured as a storage device.

Hardware 28 of multi-function premises device 16 may include communication interface 36 enabling it to communicate directly or indirectly with any component or device of system 10. For example, communication interface 36 may be configured for setting up and maintaining at least a wireless or wired connection with any component and/or device of system 10 such as security control device 20. The communication interface 36 may be formed as or may include, for example, one or more RF transmitters, one or more RF receivers, and/or one or more RF transceivers.

Hardware 28 of multi-function premises device 16 includes a multi-axis accelerometer 19 for measuring acceleration of multi-function premises device 16 in multiple directions or axes. The multi-axis accelerometer 19 may be, for example, a three-axis accelerometer. Further, multi-axis accelerometer 19 may be a digital accelerometer having a digital output for generating digital device data. Hardware 28 may include sound detector 40 for detecting sound such as, for example, the sound of glass breaking. Sound detector 40 may be used to verify analysis of device data that indicates a glass break occurred.

Multi-function premises device 16 further has software 42 stored internally in, for example, memory 34, or stored in external memory (e.g., database, storage array, network storage device, etc.) accessible by the multi-function premises device 16 via an external connection. Software 42 may include any software or program configured to perform the steps/processes of the present disclosure.

The processing circuitry 30 may be configured to control any of methods and/or processes described herein and/or to cause such methods, and/or processes to be performed, e.g., by multi-function premises device 16. Processor 32 corresponds to one or more processors 32 for performing multi-function premises device 16 functions described herein. The memory 34 is configured to store data and/or files and/or encryption elements, e.g., security tokens or keys, and/or programmatic software code and/or other information described herein. In some embodiments, the software 42 may include instructions that when executed by the processor 32 and/or processing circuitry 30, causes the processor 32 and/or processing circuitry 30 to perform the processes described herein with respect to multi-function premises devices 16. For example, processing circuitry 30 of multi-function premises device 16 may be configured to generate device data including multi-axis accelerometer data, and cause transmission of the device data to security control device 20 for analysis. Alternatively, in some embodiments, processing circuitry 30 of multi-function premises device 16 may implement one or more analysis functions of analysis unit 26 and report the results of the analysis to security control device 20 where security control device 20 triggers a premises security system alarm based on the received results.

The system 10 includes a security control device 20 including hardware 44. The hardware 44 may include processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors, processor cores, field programmable gate arrays (FPGAs), and/or application specific integrated circuits (ASICs) adapted to execute instructions. The processor 48 may be configured to access (e.g., write to and/or read from) the memory 50, which may comprise any kind of volatile and/or nonvolatile memory, e.g., cache and/or buffer memory, random access memory (RAM), read-only memory (ROM), optical memory, and/or erasable programmable read-only memory (EPROM). Further, memory 50 may be configured as a storage device.

Hardware 44 of security control device 20 may include communication interface 52 enabling it to communicate directly or indirectly with any component or device of system 10. For example, communication interface 52 may be configured for setting up and maintaining at least a wireless or wired connection with any component and/or device of system 10 such as multi-function premises device 16 and premises device 18. The communication interface 52 may be formed as or may include, for example, one or more RF transmitters, one or more RF receivers, and/or one or more RF transceivers.

Security control device 20 further has software 54 stored internally in, for example, memory 50, or stored in external memory (e.g., database, storage array, network storage device, etc.) accessible by the security control device 20 via an external connection. Software 54 may include any software or program configured to perform the steps/processes of the present disclosure.

The processing circuitry 46 may be configured to control any of methods and/or processes described herein and/or to cause such methods, and/or processes to be performed, e.g., by security control device 20. Processor 48 corresponds to one or more processors 48 for performing security control device 20 functions described herein. The memory 50 is configured to store data and/or files and/or encryption elements, e.g., security tokens or keys, and/or programmatic software code and/or other information described herein. In some embodiments, the software 54 may include instructions that, when executed by the processor 48 and/or processing circuitry 46, causes the processor 48 and/or processing circuitry 46 to perform the processes described herein with respect to security control device 20. For example, security control device 20 includes analysis unit 26 that is configured to perform one or more security control device 20 functions described herein such as with respect to, for example, selecting one or more rules (e.g., criterion, criteria, etc.) based on a sensor type of multi-function premises device 16 for analyzing device data such as to determine whether to trigger a security alarm.

Figure 3:
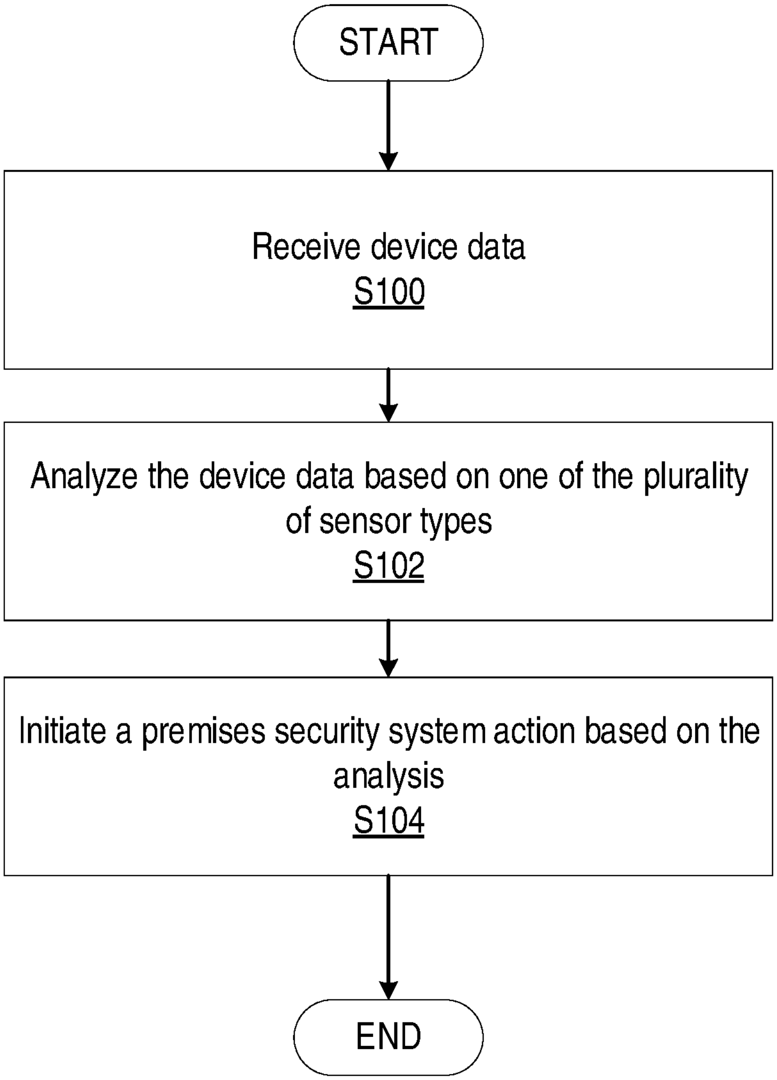
FIG. 3 is a flowchart of an example process according to some embodiments of the present disclosure.

FIG. 3 is a flowchart of an example process performed by a premises security system 12 according to one or more embodiments of the present disclosure. One or more blocks described herein may be performed by one or more elements of security control device 20 such as by one or more of processing circuitry 46 (including the analysis unit 26), processor 48, communication interface 52, etc. Security control device 20 is configured to communicate with multi-function premises device 16 that includes a multi-axis accelerometer 19 for monitoring the premises 14 according to at least one of a plurality of sensor types where multi-function premises device 16 is configured to device data comprising accelerometer data associated with the multi-axis accelerometer 19. Security control device 20 is configured to receive (Block S100) the device data, as described herein. Security control device 20 is configured to analyze the device data based on one of the plurality of sensor types, as described herein. Security control device 20 is configured to initiate a premises security system action based on the analysis, as described herein.

According to one or more embodiments, the multi-function premises device 16 is positionable at the premises 14 in a plurality of orientations, and the processing circuitry 46 is further configured to receive a base orientation of the multi-function premises device 16 after the multi-function premises device 16 is positioned at the premises for monitoring. The analysis of the device data is based on the base orientation of the multi-axis accelerometer 19.

According to one or more embodiments, the processing circuitry 46 is further configured to receive an indication that the multi-function premises device 16 has been positioned for monitoring the premises 14 according to one of a plurality of sensor types, and select at least one accelerometer criterion for analyzing the device data based on the indicated sensor type.

According to one or more embodiments, each of the plurality of sensor types is associated with at least one respective accelerometer criterion for analysis.

According to one or more embodiments, the multi-function premise device 16 is configured to use the multi-axis accelerometer 19 to monitor according to at least one of a door sensor type, a window sensor type, a vibration sensor type, a shock sensor type or a glass break sensor type.

According to one or more embodiments, the sensor type is a door or window sensor type, and the analysis of the accelerometer data comprises determining whether the accelerometer data meets an accelerometer criterion associated with the door or window sensor type, and the accelerometer criterion comprising a predefined acceleration threshold in a predefined direction.

According to one or more embodiments, the sensor type is a vibration sensor type, and the analysis of the accelerometer data comprises determining whether the accelerometer data meets an accelerometer criteria associated with the vibration sensor type. The accelerometer criteria comprising a first predefined acceleration threshold for acceleration in a first direction, a second predefined acceleration threshold for acceleration in a direction opposite the first direction, and a predefined number of instances over a predefined time window for the first and second predefined acceleration thresholds to be met.

According to one or more embodiments, the sensor type is a shock sensor type, and the analysis of the accelerometer data comprises determining whether the accelerometer data meets an accelerometer criterion associated with the shock sensor type. The accelerometer criterion comprises a predefined acceleration threshold.

According to one or more embodiments, the one of the plurality of sensor types is a glass break sensor type where the analysis of the accelerometer data comprises determining whether the accelerometer data meets at least one accelerometer criterion associated with the glass break sensor type. The accelerometer criterion comprises a predefined acceleration threshold.

According to one or more embodiments, the device data further comprises audio data associated with audio detected by the multi-function premises device 16 such as by sound detector 40 where the analysis of the audio data comprises determining whether the audio data meets a predefined audible threshold.

While the analysis functions as described as being performed by security control device 20, in one or more embodiments, one or more of these analysis functions may be performed by one or more of the multi-function premises device 16, remote monitoring center 24, etc.

Figure 4:
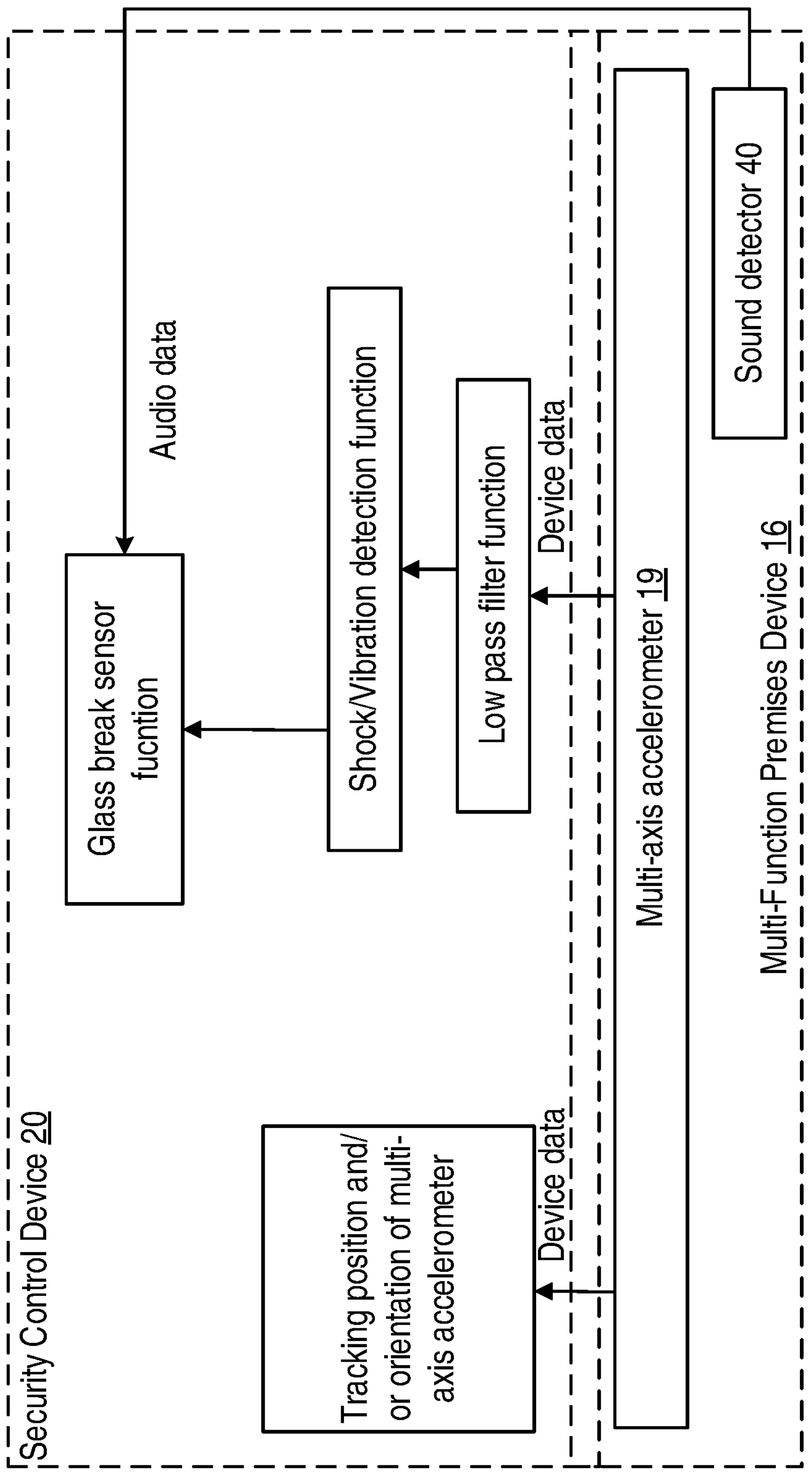
FIG. 4 is a diagram of some functions according to some embodiments of the present disclosure.

FIG. 4 is a block diagram of an example functional diagram of security control device 20 and multi-function premises device 16 according to one or more embodiments. In particular, the multi-axis accelerometer 19 is configured to provide device data including accelerometer data to allow for tracking the position and/or orientation of the multi-axis accelerometer 19 such as to provide door/window sensor functions, described below.

A multi-function premises device 16 according to various embodiments may provide door/window sensor functionality. This sensor functionality uses the multi-axis digital accelerometer to determine its location in space. For example, the secure position of the sensor will be learned by multi-function premises device 16 and/or security control device 20 during installation so that the home position (e.g., base orientation) is known to these one or more entities. This can be performed by, for example, pressing a test/set button on the multi-function premises device 16 itself. Having knowledge of the home position of the multi-axis accelerometer 19 allows the premises security system 12 to decide the closed or secure state for multi-function premises device 16, e.g., door sensor 16. Any deviation or movement from this home position may then be considered or interpreted as the door sensor 16 being in an open or violated state. That is, in one or more embodiments, the home position allows the installer to mount the multi-function premises device 16 at any location and/or orientation on the door or window as compared to the strict configuration of existing door or window sensors that must be mounted close to the frame with a magnet mounted close to it on the door to monitor close or opening of the door or window.

Another example of this position would be a closed position of the door or window or close position of an overhead garage door. Once this value is learned, device data can be used to track any deviation from that home position to determine if the door or window is opened. This allows the user to mount the multi-function premises device 16 in any position or orientation, and anywhere on the door, window, etc. where device data is monitored for a predefined deviation (e.g., predefined accelerometer criterion) from the home position to determine if the door or window is open or closed.

Further, multi-axis accelerometer 19 may be configured to provide device data that the security control device 20 analyzes (including low pass filtering and applying one or more rules (e.g., accelerometer criterion/criteria)) to provide shock and/or vibration detection or monitoring.

To this end, multi-axis accelerometer 19 can detect vibrations, which is a predefined displacement of the multi-axis accelerometer 19 in one or more directions. Hence, multi-axis accelerometer 19 is able to detect an impact to the surface on which multi-function premises device 16 is mounted which could be, for example, a door, window, etc.

Also, in one or more embodiments, glass break sensor functions may be provided using shock or vibration detection functions and audio data from sound detector 40. For example, the shock or vibration detection function is used as an initial indication of a glass break and security control device 20 may then analyze audio data to verify a glass break occurred. Hence, in one or more embodiments, the device data (e.g., multi-axis accelerometer data, audio data, etc.) generated by multi-function premises device 16 is analyzed in differently by security control device 20 based on the sensor type that multi-function premises device 16 is implemented.

Further, multi-function premises device 16 may provide glass break sensor functions.

This functionality uses a sound detector 40 (e.g., microphone) to detect a predefined sound of glass break to trigger an alarm. However, to minimize false alarm, the security control device 20 may first determine an impact to the glass has occurred by monitoring device data, e.g., shock or vibration via multi-axis accelerometer 19 using low pass filter and one or more rules (e.g., accelerator criterion/criteria). For example, the low pass filter may be used to help eliminate sensitive detections and thereby help reduce false alarms since sensitive detections may be caused by non-alarm events such as, for example, windy conditions. Then, security control device 20 will confirm the alarm by analyzing the audio data for a predefined glass break sound via sound detector 40.

Various embodiments of the present disclosure may eliminate having to install three separate sensors having different sensing elements. Additionally, various embodiments may eliminate the use of magnet and reed switch technology used in existing door or window sensors. Furthermore, embodiments may reduce false alarms that may otherwise be generated by existing glass break detectors.

The concepts described herein may be embodied as methods, data processing systems, computer program products and/or computer storage media storing executable computer programs. Accordingly, the concepts described herein may take the form of an entirely hardware embodiment, an entirely software embodiment or an embodiment combining software and hardware aspects, which are all generally referred to herein as a “circuit” or “module.” Any process, step, action and/or functionality described herein may be performed by, and/or associated with, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the end device, partly on the end device, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The embodiments described herein are not limited to what has been particularly shown and described herein above. In addition, unless mention was made above to the contrary, the accompanying drawings are not to scale. A variety of modifications and variations are possible in light of the above teachings without departing from the scope of the following claims.

What is claimed is:

1. A premises security system that is configured to monitor a premises, the premises security system comprising:
- a plurality of multi-function premises devices, each of the plurality of multi-function premises devices comprising:
  - a sound detector configured to generate audio data based on detected sounds;
  - a multi-axis accelerometer for monitoring the premises, the multi-axis accelerometer being configured to generate accelerometer data;
- a security control device in communication with the plurality of multi-function premises devices, the security control device comprising processing circuitry configured to:
  - associate a first multi-function premises device of the plurality of premises devices with a first sensor type of a plurality of sensor types;
  - associate a second multi-function premises device of the plurality of premises devices with a second sensor type of the plurality of sensor types, the second sensor type being different from the first sensor type;
  - receive the accelerometer data and the sound data from each of the plurality of multi-function premises devices;
  - analyze the accelerometer data from the first multi-function premises device according to the first sensor type, the audio data from the first multi-function premises device not being used for the first sensor type;
  - analyze the accelerometer data and the sound data from the second multi-function premises device according to the second sensor type;
  - initiate a premises security system action based on the analysis of at least one of:
    - the accelerometer data from the first multi-function premises device; or
    - the accelerometer data and the sound data from the second multi-function premises device.

2. The premises security system of claim 1, wherein each multi-function premises device is positionable at the premises in a plurality of orientations;
- wherein the processing circuitry is further configured to receive a base orientation of each multi-function premises device after each multi-function premises device is positioned at the premises for monitoring; and
- the analysis of the accelerometer data being based on the base orientation of the multi-axis accelerometer.

3. The premises security system of claim 1, wherein the processing circuitry is further configured to:
- receive an indication from each multi-function premises device that each multi-function premises device has been positioned for monitoring the premises according to one of the plurality of sensor types.

4. The premises security system of claim 3, wherein the processing circuitry is further configured to:
- select at least one accelerometer criterion for analyzing the accelerometer data based on the indicated sensor type.

5. The premises security system of claim 4, wherein the first sensor type is one of a door sensor type, a window sensor type, a vibration sensor type, or a shock sensor type; and
- the second sensor type is a glass break sensor type.

6. The premises security system of claim 1, wherein the first sensor type is a door or window sensor type;

the analysis of the accelerometer data comprises determining whether the accelerometer data meets an accelerometer criterion associated with the door or window sensor type; and the accelerometer criterion comprising a predefined acceleration threshold in a predefined direction.

7. The premises security system of claim 1, wherein the first sensor type is a vibration sensor type;

the analysis of the accelerometer data comprises determining whether the accelerometer data meets an accelerometer criteria associated with the vibration sensor type;

the accelerometer criteria comprising:

a first predefined acceleration threshold for acceleration in a first direction;

a second predefined acceleration threshold for acceleration in a direction opposite the first direction; and a predefined number of instances over a predefined time window for the first and second predefined acceleration thresholds to be met.

8. The premises security system of claim 1, wherein the first sensor type is a shock sensor type;

the analysis of the accelerometer data comprises determining whether the accelerometer data meets an accelerometer criterion associated with the shock sensor type; and the accelerometer criterion comprises a predefined acceleration threshold.

9. The premises security system of claim 1, wherein the second sensor type is a glass break sensor type;

the analysis of the accelerometer data comprises determining whether the accelerometer data meets at least one accelerometer criterion associated with the glass break sensor type; and the accelerometer criterion comprises a predefined acceleration threshold.

10. The premises security system of claim 9, wherein the analysis of the audio data comprises determining whether the audio data meets a predefined audible threshold.

11. A method implemented by a premises security system, the premises security system comprising a security control device that is configured to communicate with a plurality of multi-function premises devices, each of the plurality of multi-function premises devices comprising a sound detector configured to generate audio data based on detected sounds and a multi-axis accelerometer for monitoring a premises, the the multi-axis accelerometer being configured to generate accelerometer data, the method comprising:

associate a first multi-function premises device of the plurality of premises devices with a first sensor type of a plurality of sensor types;

associate a second multi-function premises device of the plurality of premises devices with a second sensor type of the plurality of sensor types, the second sensor type being different from the first sensor type;

receive the accelerometer data and the sound data from each of the plurality of multi-function premises devices;

analyze the accelerometer data from the first multi-function premises device according to the first sensor type, the audio data from the first multi-function premises device not being used for the first sensor type;

analyze the accelerometer data and the sound data from the second multi-function premises device according to the second sensor type; and initiate a premises security system action based on the analysis of at least one of:

the accelerometer data from the first multi-function premises device; or the accelerometer data and the sound data from the second multi-function premises device.

12. The method of claim 11, wherein each multi-function premises device from the plurality of multi-function premises devices is positionable at the premises in a plurality of orientations;

wherein the method further comprises receiving a base orientation of each multi-function premises device after each multi-function premises device is positioned at the premises for monitoring; and the analysis of the accelerometer data being based on the base orientation of the multi-axis accelerometer.

13. The method of claim 11, further comprising:

receiving an indication from each multi-function premises device that each multi-function premises device has been positioned for monitoring the premises according to one of the plurality of sensor types.

14. The method of claim 13, further comprising:

selecting at least one accelerometer criterion for analyzing the accelerometer data based on the indicated sensor type.

15. The method of claim 14, wherein the first sensor type is one of a door sensor type, a window sensor type, a vibration sensor type, or a shock sensor type; and the second sensor type is a glass break sensor type.

16. The method of claim 11, wherein the first sensor type is a door or window sensor type;

the analysis of the accelerometer data comprises determining whether the accelerometer data meets an accelerometer criterion associated with the door or window sensor type; and the accelerometer criterion comprising a predefined acceleration threshold in a predefined direction.

17. The method of claim 11, wherein the first sensor type is a vibration sensor type;

the analysis of the accelerometer data comprises determining whether the accelerometer data meets an accelerometer criteria associated with the vibration sensor type;

the accelerometer criteria comprising:

a first predefined acceleration threshold for acceleration in a first direction;

a second predefined acceleration threshold for acceleration in a direction opposite the first direction; and a predefined number of instances over a predefined time window for the first and second predefined acceleration thresholds to be met.

18. The method of claim 11, wherein the first sensor type is a shock sensor type;

the analysis of the accelerometer data comprises determining whether the accelerometer data meets an accelerometer criterion associated with the shock sensor type; and the accelerometer criterion comprises a predefined acceleration threshold.

19. The method of claim 11, wherein the the second sensor type is a glass break sensor type;

the analysis of the accelerometer data comprises determining whether the accelerometer data meets at least one accelerometer criterion associated with the glass break sensor type; and the accelerometer criterion comprises a predefined acceleration threshold.

20. The method of claim 19, wherein the analysis of the audio data comprises determining whether the audio data meets a predefined audible threshold.

* * * * *